Patented Aug. 30, 1932                                                     1,875,221

UNITED STATES PATENT OFFICE

ACHILLE CONZETTI, OF BASEL, SWITZERLAND, ASSIGNOR TO THE FIRM: J. R. GEIGY, S. A., OF BASEL, SWITZERLAND

MANUFACTURE OF STRONGLY BASIC AZODYESTUFFS

No Drawing. Application filed July 28, 1928, Serial No. 296,104, and in Germany August 6, 1927.

The present invention relates to the manufacture of strongly basic azodyestuffs and consists in converting an azo component of the benzene series capable of being coupled, by successive treatment with chloracetyl-chloride and an alkylamine of the fatty series, into a basic body of the general formula:

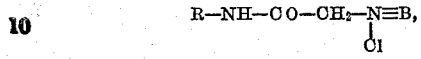

wherein R represents a radical of the benzene or naphthalene series containing a free amino group and B represents hydrogen-dialkyl groups or trialkyl groups, diazotizing the body thus obtained and coupling same to an azo component of the benzene and naphthalene series.

Such transformation into a strong basic body of the kind above referred to can take place by operation on the starting azodye component, or on a middle component, if it be used for diazotizing purposes, or on the final azodye component, or on two or more of such components at a time, in so far as that at least one of the azodye components to be coupled for obtaining the desired azodyestuffs is converted into a basic body containing the group above referred to.

Any alkylamine of the fatty series can be employed to the effect stated above; however, dialkyl- and trialkyl-amines of the fatty series are preferred. Thus, for example, dimethylamine, diethylamine, trimethylamine and so on can be used.

The following example illustrates the process:

*Example.*—21.4 kilos of chloracetyl-meta-nitraniline are introduced into 43 kilos of commercial dimethylamine solution of 23.3 per cent, strength. This mixture is heated gently for 2 hours at 60° C., then thoroughly cooled and filtered. The crude product is dissolved in 200 litres of boiling water acidified with hydrochloric acid and the solution filtered. On cooling there is obtained in satisfactory yield the hydrochloride of dimethylamine-acetyl-amino-meta-nitraniline in the form of white crystals of melting point 236° C. of the probable formula:

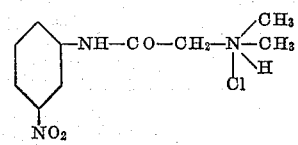

26 kilos of this nitro-product are reduced by means of iron and acetic acid in known manner. The reduction liquor is diazotized by means of 30 kilos of concentrated hydrochloric acid and 6.9 kilos of sodium nitrite. The mineral acid is neutralized by means of sodium acetate and more crystallized sodium acetate is added to the amount of 15 kilos, and into this diazo-solution is run one of 14.4 kilos of beta-naphthol in 200 litres of water and 13 kilos of caustic soda lye of 30 per cent. strength.

The dyestuff is completely precipitated. It dyes a pure orange red on tannin-mordanted cotton and an orange of good fastness to washing and light on weighted silk.

In this example, any other azodye component can be rendered strongly basic by the method above described. Thus the process can be applied to chloracetyl-para-nitraniline, chloracetyl-2:7-amidonaphthol, chloracetyl-ethyl-para-nitraniline, chloracetyl-nitro-ortho-anisidine and so on.

The products obtained yield by coupling with any usual azo component, such as beta-naphthol, phenylenediamine, meta-toluidine etc. useful azodyestuffs dyeing tanning-mordanted cotton, weighted silk and the like good tints of great fastness to washing and light.

What I claim is:

1. A process for the manufacture of strongly basic azodyestuffs, consisting in converting an azo component of the benzene series capable of being coupled, by successive treatment with chloracetyl-chloride and an alkylamine of the fatty series, into a basic body of the general formula

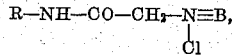

wherein R represents a radical of the benzene or naphthalene series containing a free aminogroup and B represents hydrogen-dialkyl groups or trialkyl groups, diazotizing the body thus obtained and coupling same to an azo component of the benzene and naphthalene series.

2. A process for the manufacture of strongly basic azodyestuffs, consisting in converting an azo component of the benzene series capable of being coupled, by successive treatment with chloracetyl-chloride and a dialkylamine of the fatty series, into a basic body of the general formula

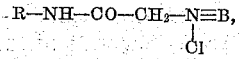

wherein R represents a radical of the benzene or naphthalene series containing a free aminogroup and B represents hydrogen-dialkyl groups, diazotizing the body thus obtained and coupling same to an azo component of the benzene and naphthalene series.

3. A process for the manufacture of strongly basic azodyestuffs, consisting in converting an azo component of the benzene series capable of being coupled, by successive treatment with chloracetyl-chloride and dimethylamine of the fatty series, into a basic body of the general formula

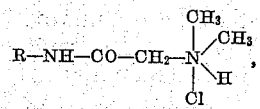

wherein R represents a radical of the benzene or naphthalene series containing a free aminogroup, diazotizing the body thus obtained and coupling same to an azo component of the benzene and naphthalene series.

4. As new articles of manufacture, the strongly basic azodyestuffs obtained by the use of an azo component of the benzene series converted by successive treatment with chloracetyl-chloride and an alkylamine of the fatty series, into a basic body of the general formula

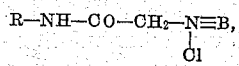

wherein R represents a radical of the benzene or naphthalene series containing a free amino-group and B represents hydrogen-dialkyl groups or trialkyl groups, diazotization of such body and its coupling to an azo component of the benzene and naphthalene series, said azodyestuffs dyeing tannin-mordanted cotton, weighted silk and the like good tints of great fastness to washing and light.

In witness whereof I have hereunto signed my name this 16th day of July, 1928.

ACHILLE CONZETTI.